United States Patent
Ammann et al.

(10) Patent No.: US 11,261,898 B2
(45) Date of Patent: Mar. 1, 2022

(54) FASTENING CLIP

(71) Applicant: ILLINOIS TOOL WORKS INC., Glenview, IL (US)

(72) Inventors: Thiemo Ammann, Rockenhausen (DE); Victor Diez Herrera, Sabadell (ES)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 16/897,866

(22) Filed: Jun. 10, 2020

(65) Prior Publication Data

US 2020/0392973 A1 Dec. 17, 2020

(30) Foreign Application Priority Data

Jun. 17, 2019 (EP) .................................. 19382503

(51) Int. Cl.
  *F16B 21/07* (2006.01)
  *F16B 5/06* (2006.01)
  *F16B 21/08* (2006.01)
  *B60R 21/20* (2011.01)

(52) U.S. Cl.
  CPC .......... *F16B 21/075* (2013.01); *F16B 5/0642* (2013.01); *F16B 21/086* (2013.01); *B60R 21/20* (2013.01)

(58) Field of Classification Search
  CPC .... F16B 21/075; F16B 21/086; F16B 5/0642; F16B 2/22; F16B 2/243; B60R 13/0206; Y10T 24/307; Y10T 24/303; Y10T 24/304
  See application file for complete search history.

(56) References Cited

U.S. PATENT DOCUMENTS

| | | | |
|---|---|---|---|
| 5,873,690 A * | 2/1999 | Danby | F16B 37/043 411/55 |
| 8,370,999 B2 * | 2/2013 | Camus | F16B 19/1081 24/295 |
| 9,453,523 B2 * | 9/2016 | Maschat | B60R 21/20 |
| 10,590,968 B2 * | 3/2020 | Benedetti | B60R 13/0206 |
| 2013/0302087 A1 * | 11/2013 | Binkert | F16B 2/24 403/345 |
| 2013/0340216 A1 | 12/2013 | Smith | |
| 2014/0109357 A1 | 4/2014 | Fischer | |

FOREIGN PATENT DOCUMENTS

| | | |
|---|---|---|
| DE | 202006007873 U1 | 7/2006 |
| DE | 102011100235 A1 | 11/2012 |
| EP | 1995097 A1 | 11/2008 |

* cited by examiner

*Primary Examiner* — Robert Sandy
*Assistant Examiner* — Rowland Do
(74) *Attorney, Agent, or Firm* — Thompson Hine LLP

(57) ABSTRACT

A fastening clip includes a clip body (1) having a pair of side walls (2) provided with windows (3); a pair of retaining portions (4) that are deflected during the placement of the fastening clip in its use position, each of the retaining portions (4) includes an end portion (5); and a head portion (6) provided at an end of the clip body (1) and protruding from the side walls (2). The end portions (5) include a bent portion (7), each end portion (5) being divided in two side portions (8) by a groove (9), and the bent portion (7) being in one of the two side portions (8). The fastening clip also includes a base body (11) having verification elements (12) that in the use position are placed in the groove (9) between the side portions (8).

12 Claims, 7 Drawing Sheets

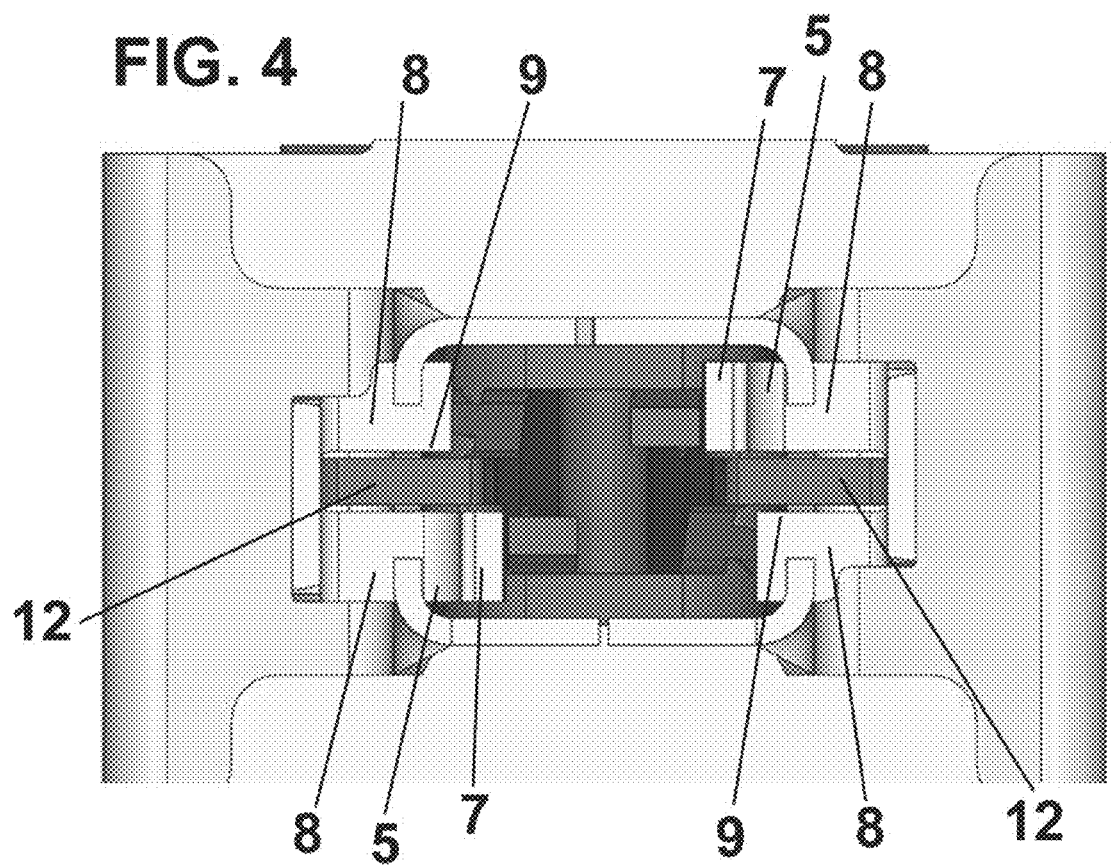

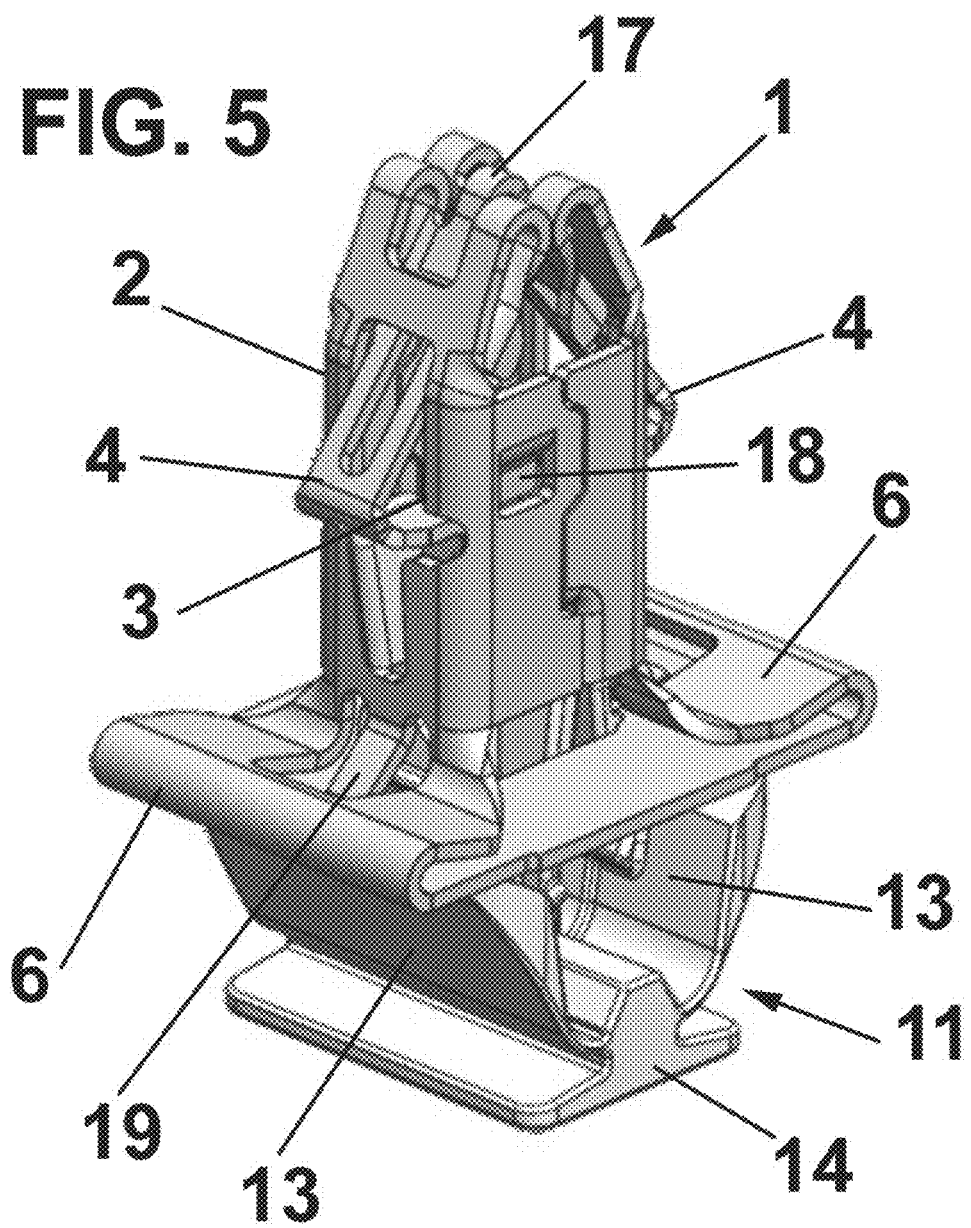

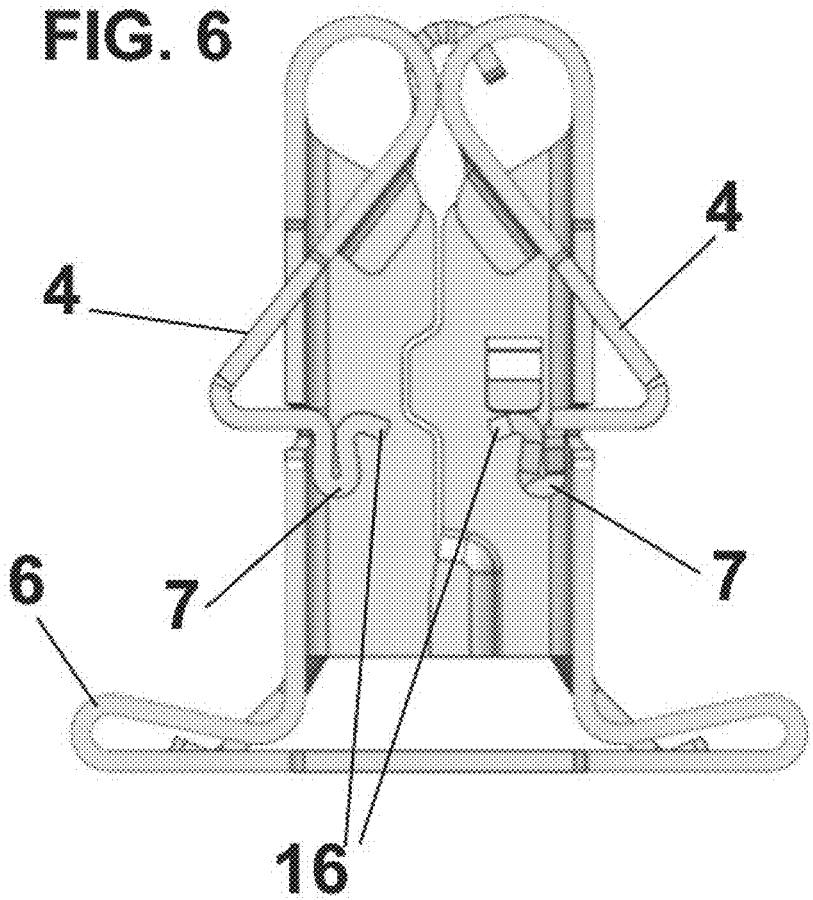

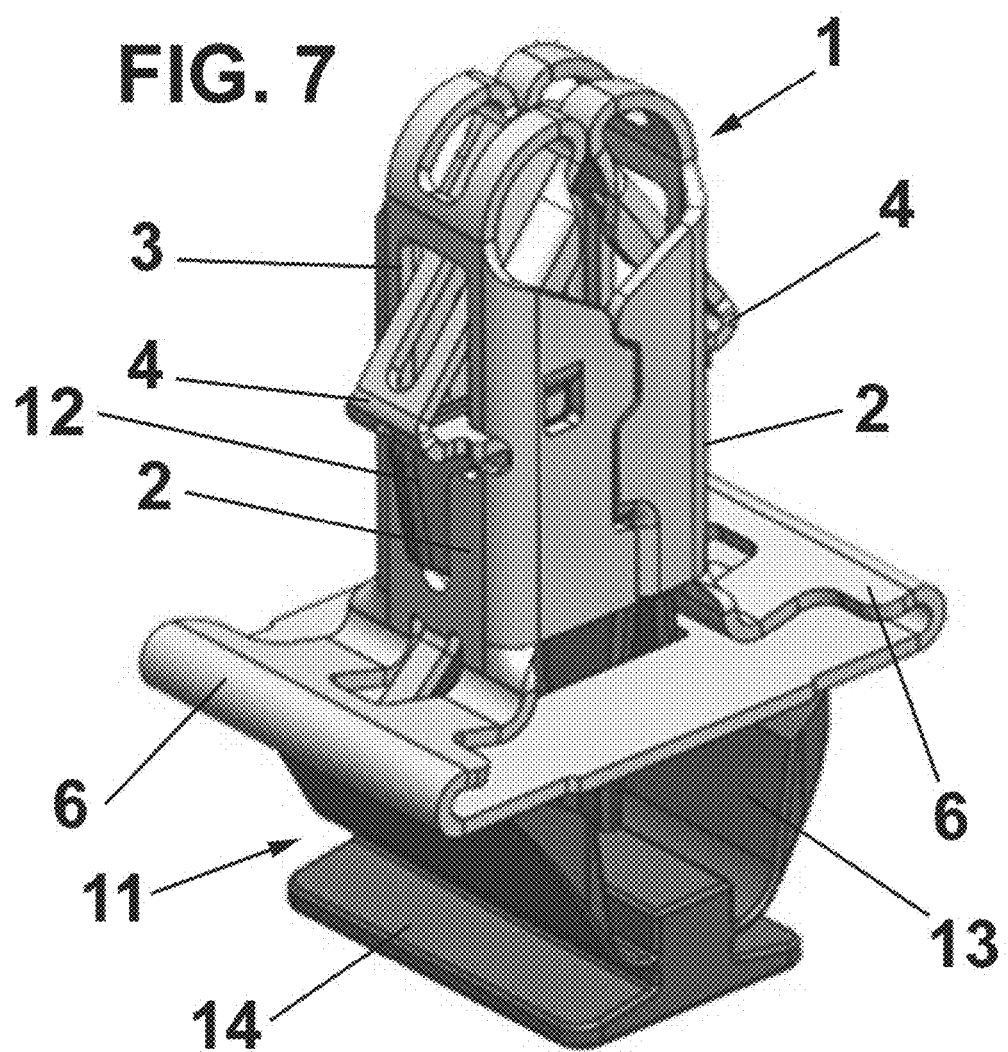

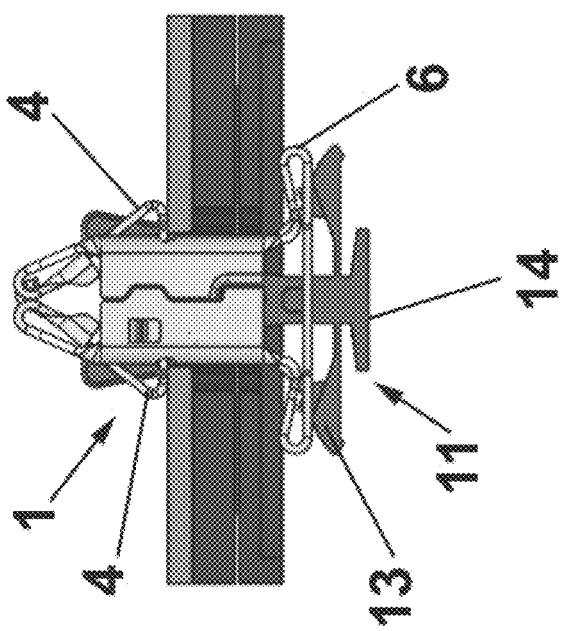
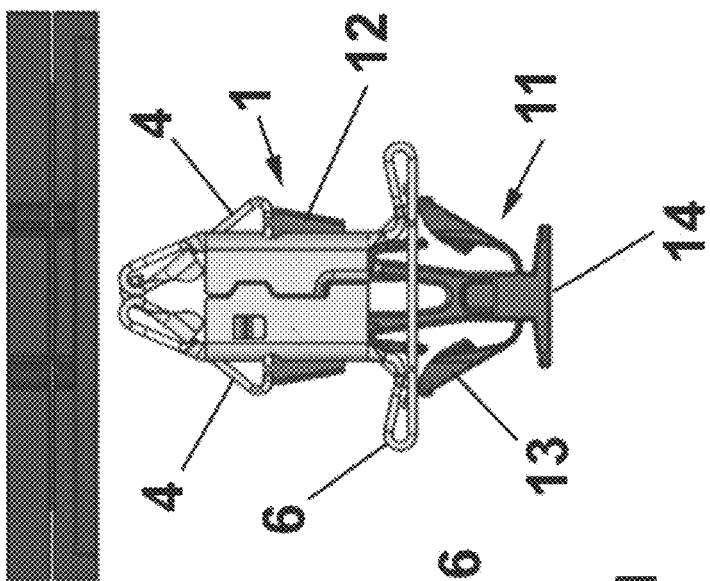
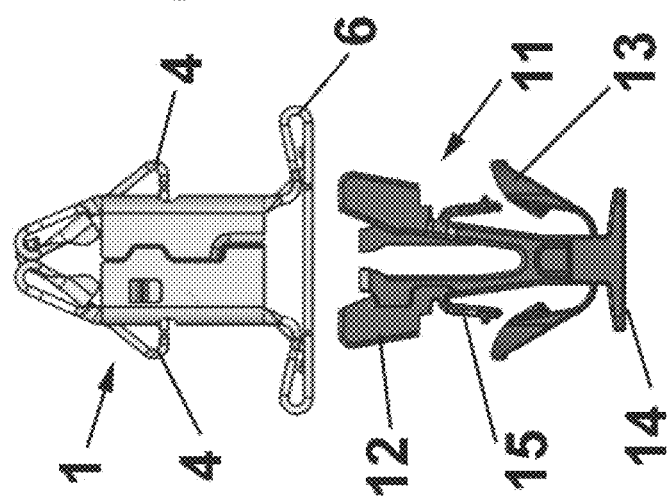

FASTENING CLIP

The present invention refers to a fastening clip, in particular, the present invention refers to a fastening clip for airbags.

BACKGROUND OF THE INVENTION

Fastening clips are used for fixing add-on parts to a vehicle body quickly and securely. A fastening clip includes a retaining portion which is inserted into a vehicle opening and snaps in place therein.

An example of this kind of fastening clips is known from DE 20 2006 007 873 U1, which discloses a generic securing clip adapted for fastening an airbag to a car body component is known. The fastening clip has a base portion adapted to be inserted in an opening of the support and including plural bending portions. In such fastening clip it is provided that the bending portions are bent about plural respective bending axes when the fastening clip is inserted. Thus, the deformation necessary for inserting the fastening clip is divided into several bending steps, thus reducing the effort (pressing force).

Another example is shown in US2014109357 A1, which discloses a fastening clip for mounting a component part, especially an airbag or an airbag module, on a support including a head portion, a clip body and retaining elements laterally projecting from the clip body which are elastically deflectable.

The clip body defines an interior and includes windows through which the retaining elements protrude outwardly from the interior and is composed of plural side walls extending from the widened substantially flat head portion.

The two side walls including the windows also have oblong extensions of which the elastically deflectable retaining elements are formed. For this purpose, the extensions extending from the respective side of the side wall facing away from the head portion are bent in a particular manner.

The extensions are subdivided into a transition portion a starting from the corresponding side wall, a retaining portion and a free end portion. The transition portion is bent inwardly so far that the retaining portion connected thereto extends outwardly from the interior of the fastening clip through the window.

The retaining portion is bent back so that the free end portion connected to the latter is guided back into the interior of the fastening clip. In the interior the free end portion of the extension extends farther than the corresponding window in the direction of the head portion.

However, the fastening clip disclosed in US2014109357 A1 has the drawback that the end portions of the retaining portions can be jammed during the insertion of the clip. If the end portion is jammed, the retaining portion is not placed in the correct position and the fastening clip does not work properly.

Therefore, one purpose of the present invention is to provide a fastening clip in which the jamming of the retaining portions during its placement in the use position is avoided, guaranteeing a correct positioning of the retaining portions.

DESCRIPTION OF THE INVENTION

With the fastening clip according to the present invention it is possible to solve said drawbacks, providing other advantages that are described below.

The fastening clip according to present invention comprises:

a clip body comprising a pair of side walls, said side walls being provided with windows;

a pair of retaining portions, a part of which protrude through said windows in the rest and use positions and that are deflected during the placement of the fastening clip in its use position, each of said retaining portions comprising an end portion; and a head portion provided at an end of the clip body and protruding from said side walls, wherein said end portions comprise a bent portion.

Preferably, the bent portion is U-shaped, such that the U-shaped bent portion in the use position is oriented vertically.

With this configuration of the end portion, any jamming during the placement of the fastening clip in its use position is prevented, because the end portion does not have any sharp end in the mounting direction.

Advantageously, each end portion is divided in two side portions by a groove, said bent portion being in one of said two side portions, and the side portion provided with the bent portion in one retaining portion is in front of the side portion not provided with the bent portion of the other retaining portion.

This arrangement of the bent portions facilitates to fulfill the dimension requirements that are mandatory in some applications, such as e.g. in fastening clips for airbags, because during the insertion of the fastening clips the bent portions do not contact to each other because they are placed in different planes.

Furthermore, in the fastening clip according to the present invention, the retaining portions can also comprise side flaps.

The fastening clip according to the present invention also comprises advantageously a base body, which can comprise:

verification elements that in the use position are placed in the groove between said side portions;

pressing flaps that are pressed against the head portion in the use position;

an inserting surface; and/or abutment elements that contact internally the side walls.

According to one embodiment, the clip body can comprise:

a hook extending from one of the retaining portions for preventing the accidental aperture of the fastening clip;

a stopper for preventing the deformation of the clip body; and/or a mounting flap placed between the side wall and the head portion.

BRIEF DESCRIPTION OF THE DRAWINGS

For a better understanding the above explanation and for the sole purpose of providing an example, some non-limiting drawings are included that schematically depict a practical embodiment.

FIG. 4 is a plan view of the fastening clip according to FIG. 1, showing the position of the bent portions;

FIG. 5 is a sectional elevation view of a portion of the fastening clip according to a second embodiment of the fastening clip according to the present invention, showing the shape of one of the end portions;

FIG. 6 is a perspective view of a third embodiment of the fastening clip according to the present invention;

FIG. 7 is a perspective view of a fourth embodiment of the fastening clip according to the present invention; and FIGS. 8-10 are elevation views of the fastening clip according to the present invention showing the process for placing the fastening clip in its use position.

DESCRIPTION OF PREFERRED EMBODIMENTS

Figure 1:
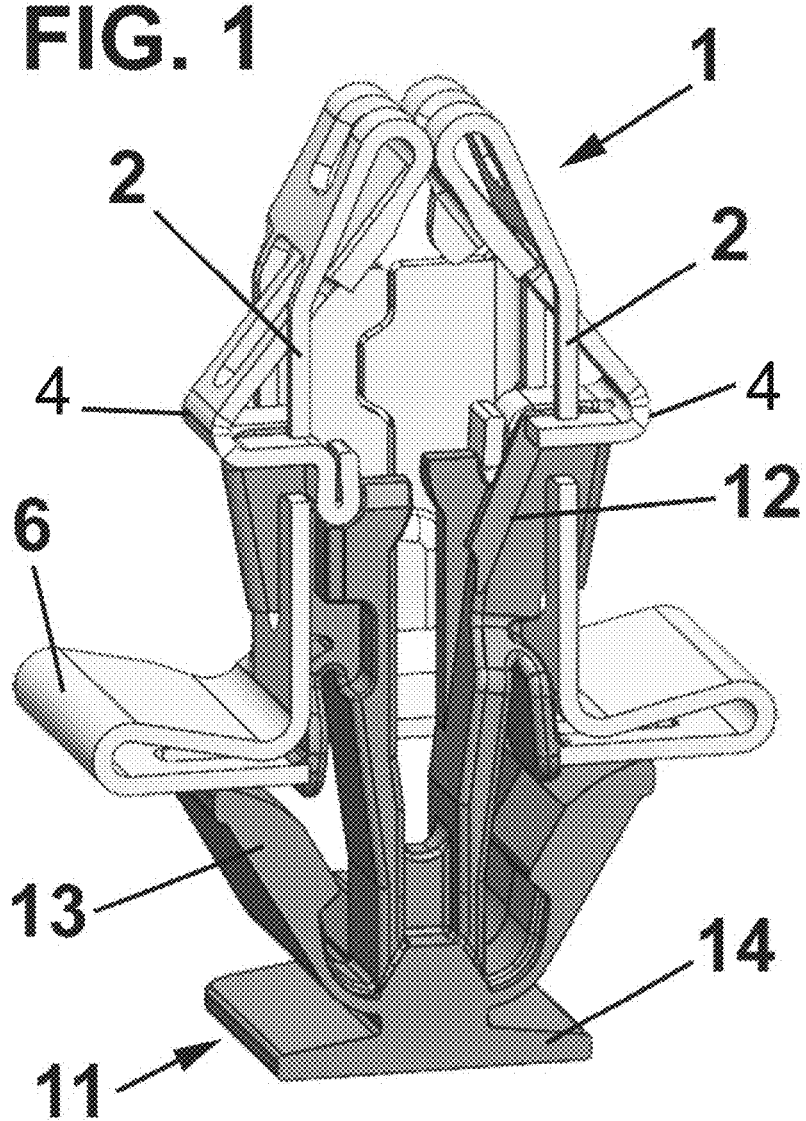
FIG. 1 is a sectional perspective view of the fastening clip of the present invention according to a first embodiment.

The fastening clip according to a first embodiment of the present invention is shown in a perspective view in FIG. 1. This fastening clip comprises a clip body 1 comprising a pair of side walls 2, each side wall 2 being provided with one window 3. The clip body 1 is preferably made from a metal.

Figure 2:
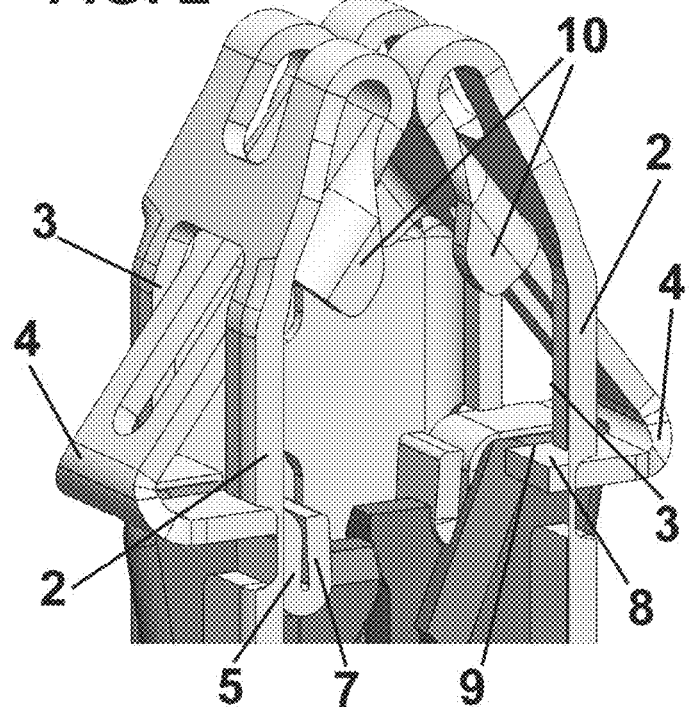
FIG. 2 is a sectional perspective view of a portion of the fastening clip according to FIG. 1.

The fastening clip also comprises a pair of retaining portions 4, a part of which protrude through said windows 3 in the rest and use positions, as shown in FIGS. 1 and 2.

These retaining portions 4 are preferably made in one piece with the clip body 1 and they are elastic, which means that they are deflected during the placement of the fastening clip in its use position, returning to the shown position when the fastening clip is mounted in its position.

Each of said retaining portions 4 are joined to the side walls 2 by one of their ends, and each of the retaining portions 4 comprises an end portion 5, which is the other end, i.e. the end not joined to the side wall 2. The configuration of the side walls 2 can be clearly seen in FIG. 3.

The fastening clip also comprises a head portion 6 provided at an end of the clip body 1 and protruding from said side walls 2. This head portion 6 contacts with one side of the component to be fastened by the clip, as shown in FIG. 7.

For preventing the jamming of the retaining portions 4 during the placement of the fastening clip in its use position, said end portions 5 comprise a bent portion 7 which is preferably a U-shape bent portion.

Figure 3:
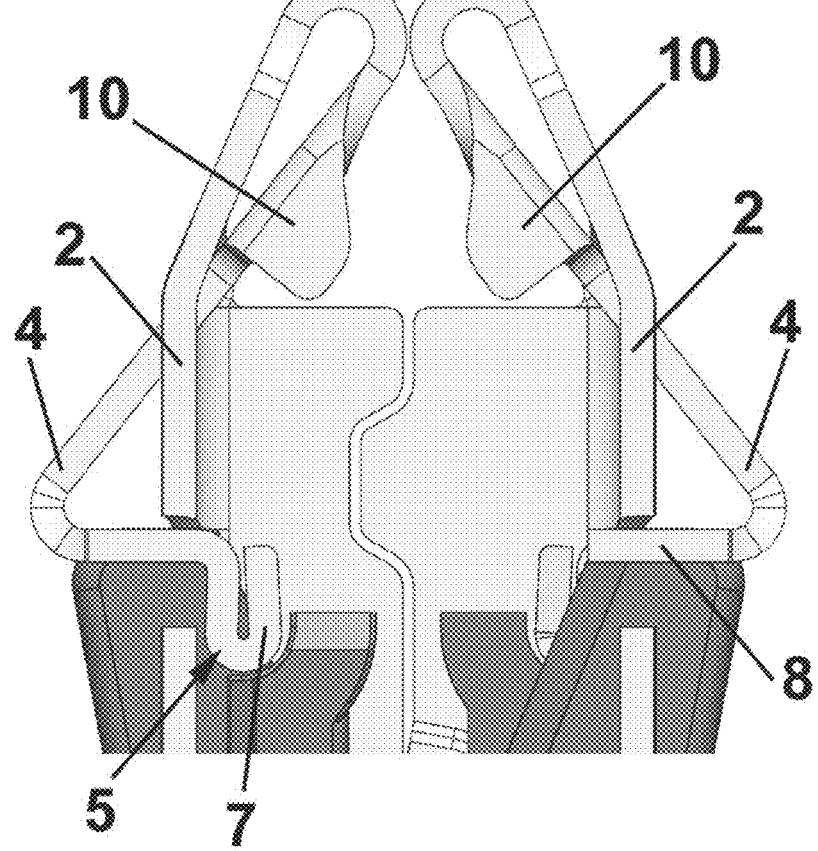
FIG. 3 is a sectional elevation view of a portion of the fastening clip according to FIG. 1, showing the shape of one of the end portions.

As shown in FIG. 3, the U-shaped bent portion 7 is vertically oriented in the use position, and as shown in more detail in FIG. 4, each end portion 5 is divided in two side portions 8 by a groove 9, said bent portion 7 being in one of said two side portions 8.

For permitting to fulfill the dimension requirements and for preventing the contact between the bent portions 7 during the placement of the fastening clip in its use position, the side portion 8 provided with the bent portion 7 in one retaining portion 4 is in front of the side portion 8 not provided with the bent portion 7 of the other retaining portion 4.

Furthermore, the retaining portions 4 also comprise side flaps 10.

As shown in FIG. 1, the fastening clip also comprises a base body 11, which is a piece e.g. made from plastic, which is placed inside the clip body 1 during the placement of the fastening clip in its use position, as shown in FIG. 5.

Said base body 11 comprises verification elements 12 that in the use position are placed in the groove 9 between said side portions 8, pressing flaps 13 that are pressed against the head portion 6 in the use position, an inserting surface 14 and abutment elements 15 that contact internally the side walls 2.

The verification elements 12 fix the base body 11 to the clip body 1 and the inserting surface 14 is used as a surface to be pressed by an operator for placing the fastening clip in its use position.

In FIG. 5 a second embodiment of the fastening clip is shown. For simplicity reasons, the same numeral references are used.

The differences with respect to the previous embodiment are the following.

Firstly, the clip body 1 comprises a hook 17 extending from one of the retaining portions 4 for preventing the accidental aperture of the fastening clip.

Secondly, the clip body 1 comprises a stopper 18 for preventing the deformation of the clip body 1.

Thirdly, the clip body 1 also comprises a mounting flap 19 placed between the side wall 2 and the head portion 6.

In FIG. 6 a third embodiment of the fastening clip is shown. For simplicity reasons, the same numeral references are used.

The main difference in this embodiment is that the bent portions 7 provided at the end portions 5 also comprise an appendix 16 at the distal end of said bent portions 7, said appendix 16 being directed inwardly.

Furthermore, the side walls 2 are completely vertical and define a substantially circular bent portion with the retaining portions 4.

In FIG. 7 a fourth embodiment of the fastening clip is shown. For simplicity reasons, the same numeral references are used.

The main difference in this embodiment is that the side walls 2 are also completely vertical, but they do not define a substantially circular bent portion with the retaining portions 4, but a curved bent portion for reducing the height of the fastening clip with respect to the fastening clip according to the third embodiment.

It is clear that the features of the described embodiments can be combined as desired.

The process for placing the fastening clip in the use position is shown in FIGS. 8-10.

Before providing the fastening clip to the operator, the base body 11 is inserted inside the clip body 1 (FIG. 8) fixing the base body 11 to the clip body 1.

When the fastening clip is mounted, the fastening clip is inserted in a hole for fixing one component to another, e.g. for fixing an airbag to a mounting surface of a vehicle. During the insertion, the retaining portions 4 are deflected inwardly when the retaining portions 4 contact the side edges of this hole. To this target, the retaining portions 4 have an inclined or sloped configuration.

When the retaining portions 4 pass the hole, they return to its original position thanks to their elastic nature. Due to the verification elements 12 are inside the hole, they follow the movement if the verification elements 12 have been opened correctly.

Finally, as shown in FIG. 10, the components are fastened together by the retaining portions 4 and the head portion 6.

Even though reference has been made to a specific embodiment of the invention, it is obvious for a person skilled in the art that the fastening clip described herein is susceptible to numerous variations and modifications, and that all of the details mentioned can be substituted for other technically equivalent ones without departing from the scope of protection defined by the attached claims.

What is claimed is:

1. A fastening clip, comprising:
  a clip body comprising a pair of side walls, said side walls being provided with windows;

a pair of retaining portions, a part of which protrude through said windows in a rest position and a use position and that are deflected during the placement of the fastening clip in its use position, each of said retaining portions comprising an end portion; and a head portion provided at an end of the clip body and protruding from said side walls, wherein said end portions comprise a bent portion, each end portion being divided in two side portions by a groove, and said bent portion being in one of said two side portions, and wherein the fastening clip also comprises a base body comprising verification elements that in the use position are placed in the groove between said side portions.

2. A fastening clip according to claim 1, wherein each bent portion is U-shaped.

3. A fastening clip according to claim 2, wherein said U-shaped bent portion is vertically oriented in the use position.

4. A fastening clip according to claim 1, wherein the side portion provided with the bent portion in one retaining portion is in front of the side portion not provided with the bent portion of the other retaining portion.

5. A fastening clip according to claim 1, wherein the retaining portions also comprise side flaps.

6. A fastening clip according to claim 1, wherein said base body comprises pressing flaps that are pressed against the head portion in the use position.

7. A fastening clip according to claim 1, wherein said base body comprises an inserting surface.

8. A fastening clip according to claim 1, wherein said base body comprises abutment elements that contact internally the side walls.

9. A fastening clip according to claim 1, wherein the clip body comprises a hook extending from one of the retaining portions.

10. A fastening clip according to claim 1, wherein the clip body comprises a stopper for preventing the deformation of the clip body.

11. A fastening clip according to claim 1, wherein the clip body also comprises a mounting flap placed between the side wall and the head portion.

12. A fastening clip, comprising:

a clip body with a pair of side walls, each of said side walls being provided with a window;

a pair of retaining portions, wherein each retaining portion includes a part that protrude through one of the windows in a rest position and a use position and that is deflected during the placement of the fastening clip in its use position, each retaining portion comprising an end portion; and a head portion provided at an end of the clip body and protruding from said side walls, wherein each end portion comprises a bent portion, wherein each end portion is divided in two side portions by a groove, and, for each end portion, the bent portion is in one of said two side portions of the end portion, and wherein the fastening clip also comprises a base body having a pair of verification elements, wherein, in the use position, each verification element is placed in a respective one of the grooves.

* * * * *